United States Patent
Venkatraman et al.

(10) Patent No.: US 10,113,516 B2
(45) Date of Patent: Oct. 30, 2018

(54) EXTENDED GASKET PROFILE

(71) Applicant: Mann+Hummel GMBH, Ludwigsburg (DE)

(72) Inventors: Sridhar Venkatraman, Tiruppur District (IN); Mridul Sharma, Bangalore (IN); Daniel Schmid, Sachsenheim (DE); Deepak Mk, Bangalore (IN); Rohit Dattatray Surve, Bangalore (IN); Jithin Vr, Thrissur (IN)

(73) Assignee: MANN+HUMMEL GmbH, Ludwigsburg (DE)

( * ) Notice: Subject to any disclaimer, the term of this patent is extended or adjusted under 35 U.S.C. 154(b) by 341 days.

(21) Appl. No.: 14/959,435

(22) Filed: Dec. 4, 2015

(65) Prior Publication Data
US 2016/0160816 A1    Jun. 9, 2016

(30) Foreign Application Priority Data
Dec. 6, 2014    (IN) .......................... 3922/MUM/2014

(51) Int. Cl.
| | |
|---|---|
| *F02M 35/024* | (2006.01) |
| *B01D 46/10* | (2006.01) |
| *F02M 35/02* | (2006.01) |
| *B01D 46/00* | (2006.01) |

(52) U.S. Cl.
CPC ... *F02M 35/02416* (2013.01); *B01D 46/0005* (2013.01); *B01D 46/10* (2013.01); *F02M 35/0201* (2013.01); *F02M 35/0209* (2013.01); *B01D 2271/02* (2013.01)

(58) Field of Classification Search
CPC ................ B01D 46/10; B01D 2271/02; B01D 2271/027; B01D 46/0005; F02M 35/0201; F02M 35/02416; F02M 35/02433; F02M 35/02491; F02M 35/0209
USPC .......................................................... 55/502
See application file for complete search history.

(56) References Cited

U.S. PATENT DOCUMENTS

| 4,861,359 A | 8/1989 | Tettman |
|---|---|---|
| 2004/0011010 A1 | 1/2004 | Rotter et al. |

FOREIGN PATENT DOCUMENTS

| DE | 102004026105 A1 | 12/2004 |
|---|---|---|
| DE | 102010020261 A1 | 12/2010 |
| EP | 0534079 A2 | 3/1993 |
| EP | 1433947 A2 | 6/2004 |
| FR | 2922269 A1 | 4/2009 |
| WO | 2011/076586 A1 | 6/2011 |
| WO | 2013093685 A1 | 6/2013 |

*Primary Examiner* — Robert Clemente
(74) *Attorney, Agent, or Firm* — James Hasselbeck

(57) ABSTRACT

The invention relates to a filter element unit for an air filter of a vehicle with an internal combustion engine, including: a filter element, a filter medium; and a one-piece gasket. The gasket includes: a first part circumferentially surrounding the filter element and adapted to seal the filter element against a first channel of a filter housing of the air filter and a second part formed unitary with the first part and spaced away from the first part and spaced away from the filter medium, the second part is adapted to seal a second channel of the filter housing; wherein the first part and the second part are connected with each other via at least two bridges.

11 Claims, 3 Drawing Sheets

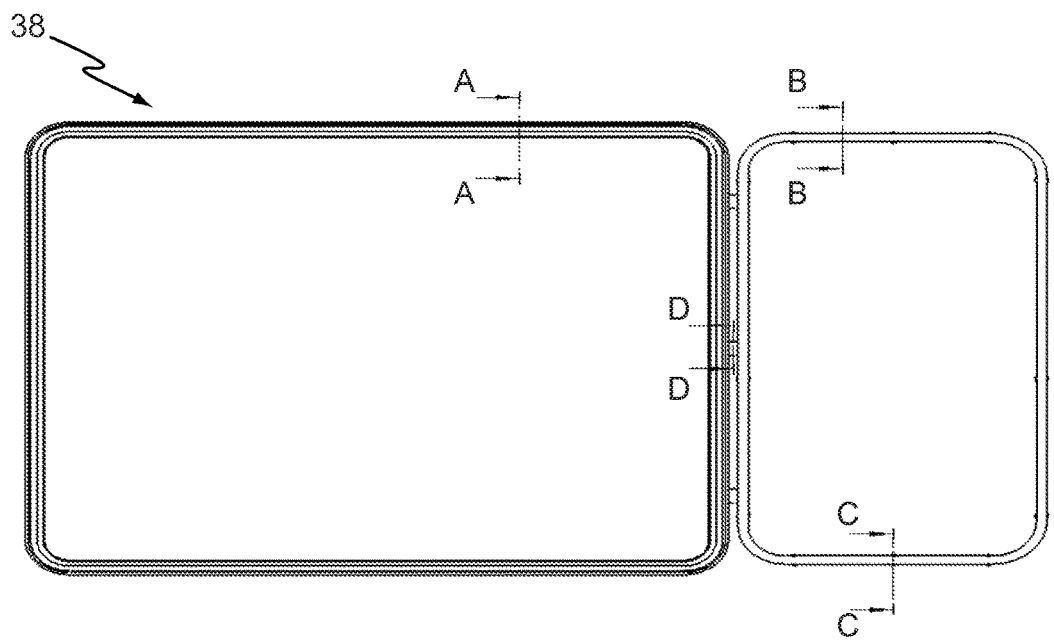
Fig. 4
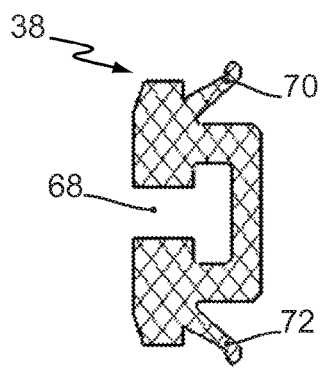
Fig. 5  A-A
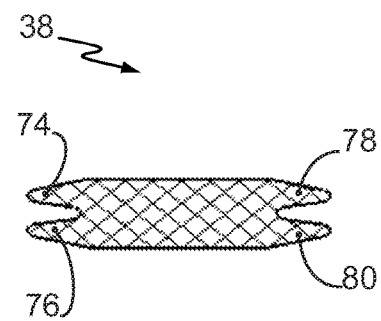
Fig. 6  B-B
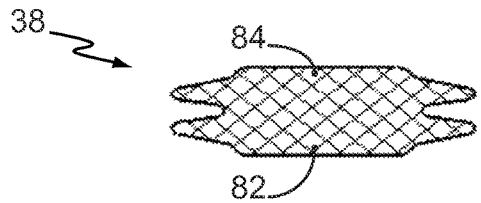
Fig. 7  C-C
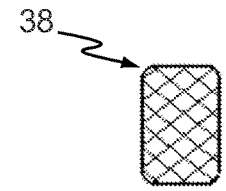
Fig. 8  D-D

EXTENDED GASKET PROFILE

TECHNICAL FIELD

The invention relates to a filter element unit for an air filter. Such an air filter can be used for filtering air in an air intake of a vehicle's internal combustion engine.

BACKGROUND OF THE INVENTION

DE 10 2004 026 105 A1 discloses an air filter for an internal combustion engine. The air filter comprises a filter element. In order to filter air, an air stream hits the filter element from below, passes the filter element and leaves it from its upper surface. The air filter has a flat structure so that it can be mounted on top of the internal combustion engine.

WO 2011/076586 A1 shows an air filter with a gasket. The gasket seals a filter element of the air filter to a filter housing of the air filter.

WO 2013/093685 A1 discloses an air filter for an internal combustion engine. The air filter has a filter housing. In the filter housing a filter element separates a dirty air side from a clean air side. The filter housing has a channeling section with an inlet and outlet for the air and a filter section with the filter element. The filter element is sealed to the clean air side via a filter section of the gasket. The gasket furthermore has a channeling section for sealing the channeling section of the housing. Channeling section and filter section of the gasket share a common section.

FR 2 922 269 A1, U.S. Pat. No. 4,861,359 and EP 1 433 947 A2 respectively show a similar air filter with a gasket for covering two sections of a filter housing.

DE 10 2010 020 261 A1 discloses an air filter with a gasket. The gasket covers three openings of the air filter.

US 2004/0011010 A1 shows an air filter and a corresponding filter element for use in an internal combustion engine. The air filter has an intake silencing chamber, where external air is input and passed to a filter element. The intake silencing chamber is sealed by a gasket of the filter element.

Finally, EP 0 534 079 A2 discloses an air filter with a gasket. A main part of the gasket seals a filter element on top of an inlet chamber of a filter housing. An additional part of the gasket seals an outlet chamber of the filter housing. Inlet chamber and outlet chamber are separated by a separation wall. The main part of the gasket shares a common bridge with the additional part of the gasket, whereby the bridge is put on the separation wall.

The gaskets of the aforementioned filter element units provide the same cross-section for both parts of the gasket. The gaskets known in the art are thus inflexible in terms of their application to different channels of the air filter. For example, the gasket might be applied to provide radial sealing properties to a first channel and axial sealing properties to a second channel. Such different sealing properties up to now are not provided by a single gasket with homogeneous cross section and two openings, but only by two different individual gaskets. However, two different individual gaskets need to be installed in an elaborate way.

SUMMARY OF THE INVENTION

Hence, the object of the invention at hand is to provide a filter element unit with a gasket that is adaptable during its production to seal different channels of an air filter.

The filter element unit for an air filter of a vehicle with an internal combustion engine has a filter element with a filter medium and a one-piece gasket with a first part and a second part, whereby the first part surrounds the filter element to seal the filter element against a first channel of a filter housing of the air filter, whereby the second part is able to seal a second channel of the filter housing and whereby the first part and the second part are connected with each other via at least two bridges of the gasket.

The gasket (sealing structure) according to the invention can be seen as two "sealing rings", which are connected with each other via at least two bridges, whereby the sealing rings and the bridges are all made out of a single piece. Due to the bridges, both sealing rings (first part and second part) of the gasket can be installed at once in the filter housing. However, the gasket still provides the adaptability of two individual sealing rings to satisfy individual sealing requirements.

Preferably the first part of the gasket is built to accomplish two tasks: Firstly, it seals the filter element with respect to a first channel of the filter housing. Secondly, it seals the connection between a lower part, i.e. a first piece of the filter housing, against an upper part, i.e. a second piece, of the filter housing at this first channel. The second part of the gasket preferably seals the connection between the lower part and the upper part of the filter housing at the second channel.

Preferably, the first part and the second part of the gasket are connected with each other via three bridges. The gasket is then built both stable and easily removable from its mold.

In order to achieve a space saving arrangement of the air filter, the first part preferably has a substantially rectangular form.

Minimum space requirements for the air filter can be achieved, when the second part has a substantially rectangular form.

In order to improve sealing of the filter element and ease of handling of the filter element during installation into the filter housing, the first part preferably has a cavity, in which a protrusion of the filter element is at least partially introduced.

In an advantageous embodiment, the first part and the second part have different cross sections in order to fulfill different sealing requirements at the first channel and the second channel respectively.

In a further embodiment, the bridges have a substantially rectangular cross section. A rectangular cross section assures easy removing of the gasket out of its mold. Furthermore, the bridges guarantee good stability of the gasket.

In order to simplify design and production of the gasket, all bridges have preferably the same cross section.

The first part and/or the second part may have a least one rib for the assembly of the gasket into the filter housing. The rib simplifies fast inserting of the gasket in the filter housing. In a preferred embodiment, the first part and/or the second part have two ribs opposite to each other in the axial direction, i.e. in the direction of the air flow through the channel.

In a further preferred embodiment, the first part and/or the second part have at least two sealing protrusions for sealing a channel in its axial direction, i.e. in the direction of the air flow through the channel.

The gasket according to the invention is preferably made of ethylene propylene diene monomer (EPDM) rubber to achieve high elasticity as well as good chemical resistance. The gasket can also be made out of polyurethane (PU) to achieve reproducible elasticity for a long time.

The invention also relates to an air filter with a filter housing and a filter element described before, wherein the filter element separates a dirty air side from a clean air side in the first channel and the second part of the gasket seals a second channel, which leads to an inlet or an outlet of the air filter.

BRIEF DESCRIPTION OF THE DRAWINGS

Other advantages and features of the invention will be appreciated from the following description of embodiments with reference to the figures of the drawings, which show significant details and from the claims. The individual features may each be carried out individually or carried out together in any combination in variants of the invention.

FIG. 4 shows a gasket of the filter element unit according to FIG. 2.

FIG. 5 shows a first cross section of the gasket according to FIG. 4 at the position A-A.

FIG. 6 shows a second cross section of the gasket according to FIG. 4 at the position B-B.

FIG. 7 shows a third cross section of the gasket according to FIG. 4 at the position C-C.

FIG. 8 shows a fourth cross section of the gasket according to FIG. 4 at the position D-D.

DETAILED DESCRIPTION OF THE INVENTION

Figure 1:
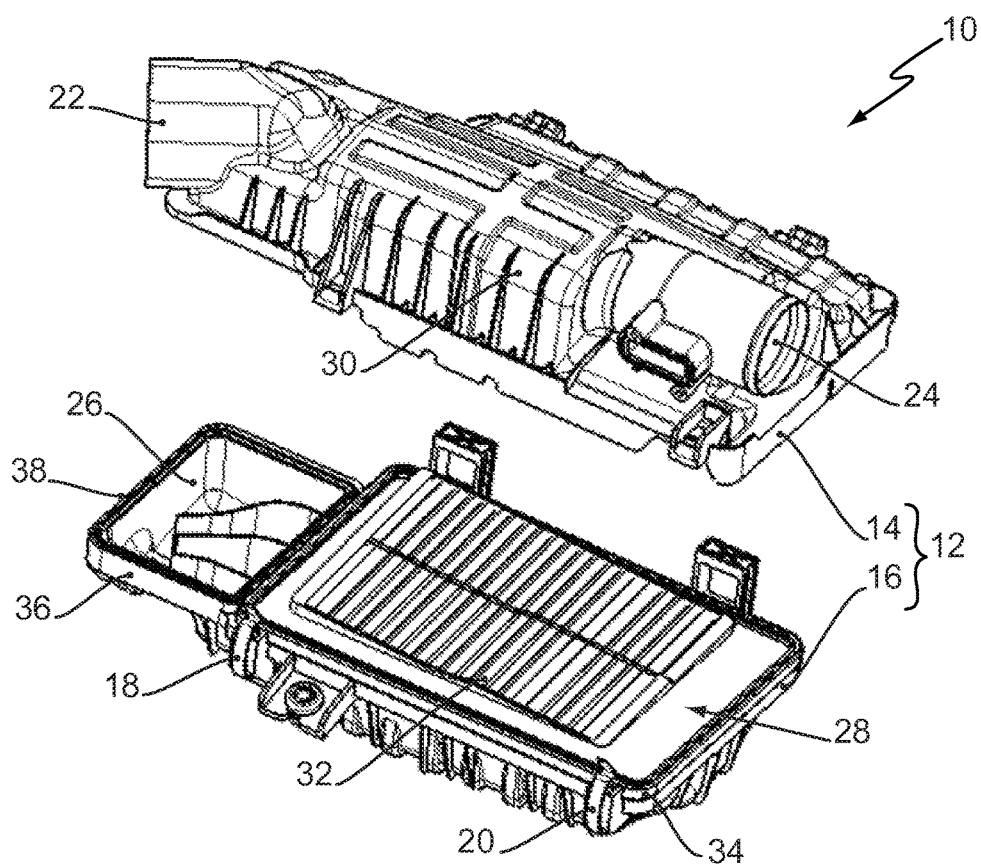
FIG. 1 shows a first air filter in an exploded view.

FIG. 1 shows a first air filter 10 with a filter housing 12. The filter housing 12 comprises an upper part 14 and a lower part 16. The expressions "upper" and "lower" thereby correspond to the direction of installation of the first air filter 10 in a vehicle (not shown). The upper part 14 can be connected to the lower part 16 via snap-fit connectors 18, 20. The first air filter 10 is usually installable on top of an internal combustion engine (not shown) of the vehicle. Hence, the first air filter 10 has a substantially flat, rectangular shape.

The filter housing 12 has an inlet 22 and an outlet 24. The inlet 22 leads the air in a dirty air side 26. Afterwards the air passes through a filter element 28, enters a clean air side 30 and leaves the first air filter 10 via the outlet 24. Hence, the filter element 28, comprising a filter medium 32, is hit by the air in an upstream flow. In other words, the air flow is directed against the filter medium 32 from below. The upstream flow has the advantage that condensed water does not pollute the air in the clean air side 30.

The filter element 28 is installed in a first channel 34 of the filter housing 12. The dirty air side 26 is part of a second channel 36 of the filter housing. First channel 34 and second channel 36 are both sealed by a gasket 38. In other words, the gasket 38 seals the first channel 34 and the second channel 36 between the lower part 16 and the upper part 14 of the filter housing 12.

Figure 2:
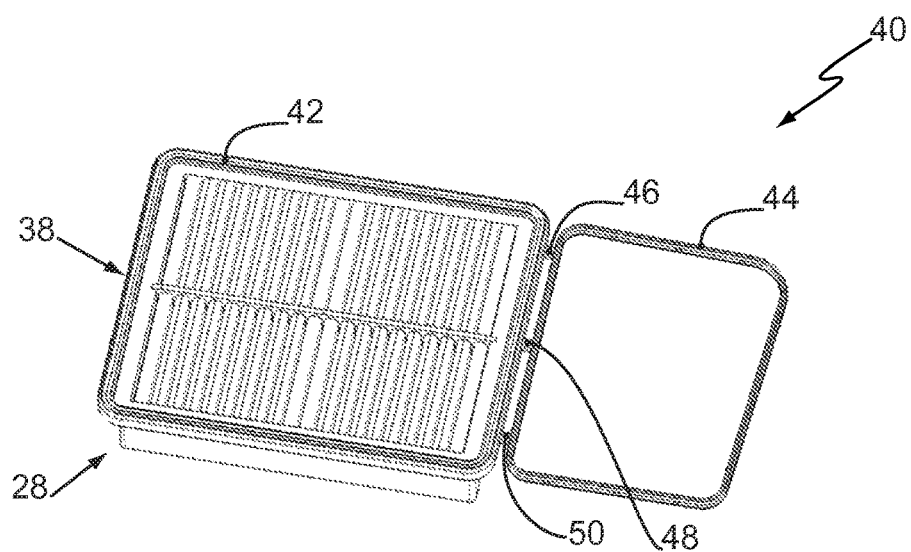
FIG. 2 shows a filter element unit of the first air filter according to FIG. 1.

FIG. 2 shows a filter element unit 40, consisting of the filter element 28 and the gasket 38. The gasket 38 is made out of one piece. It has a first part 42, which is circumferentially closed and surrounding the filter element 28 and a second part 44 which is also circumferentially closed. First part 42 and second part 44 have a substantially rectangular form and are spaced apart from each other. They are connected with each other via three bridges 46, 48, 50 of the gasket 38. As shown, the three bridges 46, 48, 50 are also spaced apart from each other. Thus, the first part 42 can be designed individually of the second part 44 of the gasket 38.

Figure 3:
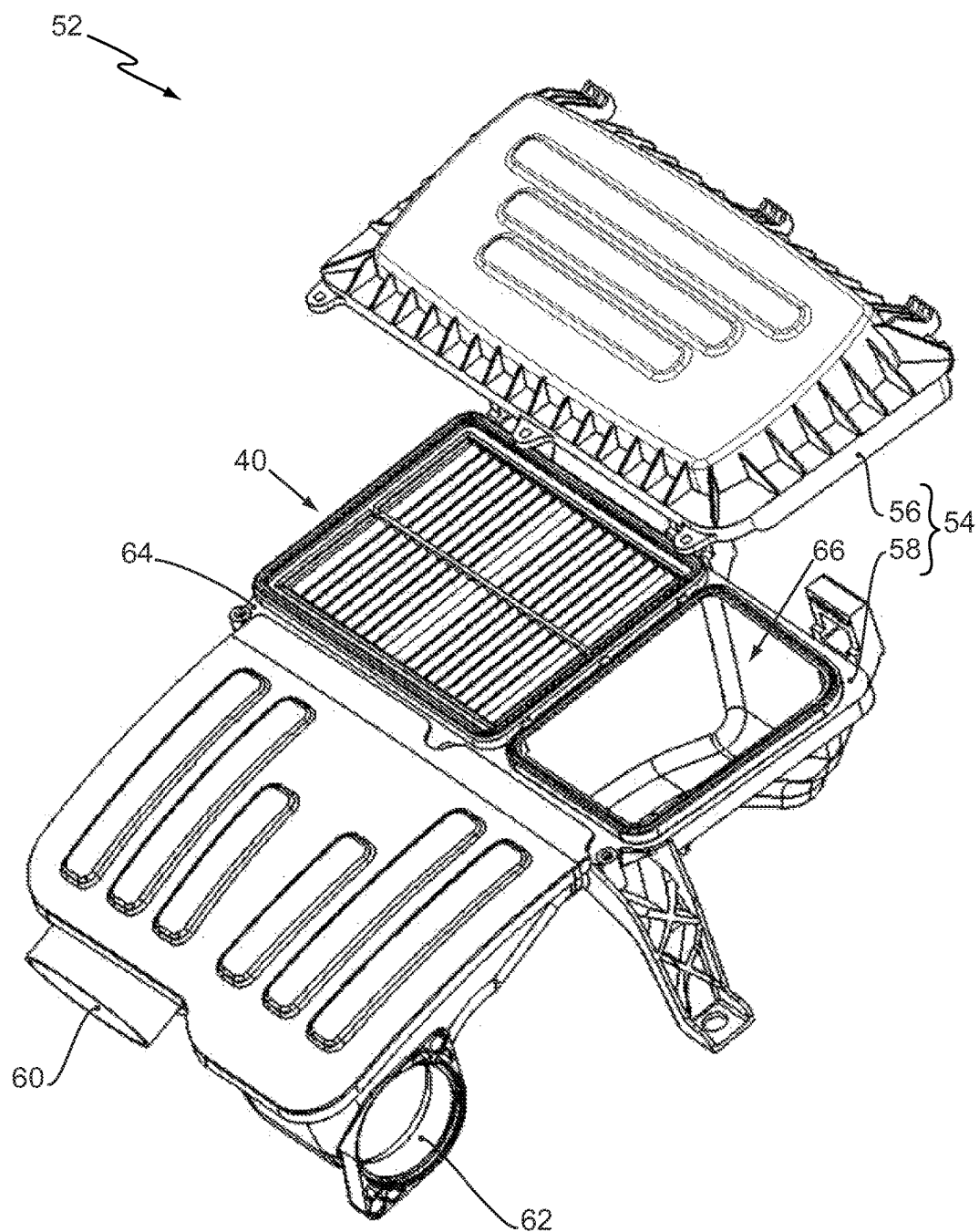
FIG. 3 shows a second air filter in an exploded view.

FIG. 3 shows a second air filter 52. It has a filter housing 54 with an upper part 56 and a lower part 58. The lower part 58 provides an inlet 60 and an outlet 62. In the filter housing 54, the filter element unit 40 (see also FIG. 2) is installed. The filter housing 54 has a first channel 64 and a second channel 66. In contrast to the first air filter 10 (see FIG. 1), in the second air filter 52 the second channel 66 leads to the outlet 62 instead of the first channel 34 (see FIG. 1). The second channel 66 can thus be used as a room to homogenize the air flow at the outlet 62. Velocity and other properties of such a homogenized air flow can be measured more precisely.

FIG. 4 shows the gasket 38 (see also FIG. 2). The gasket 38 is preferably made of ethylene propylene diene monomer (EPDM) rubber to achieve high elasticity as well as good chemical resistance. The gasket 38 can also be made out of polyurethane (PU) to achieve reproducible elasticity for a long time.

FIG. 5 shows a first cross section of the gasket 38 at the position A-A (see FIG. 4). FIG. 5 hence shows a cross section of the first part 42 (see FIG. 2) of the gasket 38. In this first part 42, the gasket 38 has a cavity 68 to receive a surrounding protrusion (not shown) of the filter element 28 (see FIG. 2). In the first part 42, the gasket 38 furthermore has a first sealing protrusion 70 and a second sealing protrusion 72 for sealing the first channel 64 (see FIG. 3) in its axial direction, i.e. in the direction of the air flow through the first channel 64.

FIG. 6 shows a second cross section of the gasket 38 at the position B-B (see FIG. 4). FIG. 6 hence shows a cross section of the second part 44 (see FIG. 2) of the gasket 38. In this second part 44, the gasket 38 has a first sealing protrusion 74, a second sealing protrusion 76, a third sealing protrusion 78 and a fourth sealing protrusion 80 for sealing the second channel 66 (see FIG. 3) in its axial direction, i.e. in the direction of the air flow through the second channel 66. As can be seen from FIG. 5 and FIG. 6, the first part 42 (see FIG. 2) and the second part 44 (see FIG. 2) of the gasket 38 have different cross sections. The cross sections are optimized for the individual sealing requirements of both the first channel 34, 64 (see FIG. 1 and FIG. 3) and the second channel 36, 66 (see FIG. 1 and FIG. 3).

FIG. 7 shows a third cross section of the gasket 38 at the position C-C (see FIG. 4). In contrast to the cross section at the position B-B (see FIG. 6), the gasket 38 has at the position C-C has two ribs 82, 84 for the smooth assembly of the gasket 38 into the filter housing 12, 54 (see FIG. 1 and FIG. 3). The second part 44 (see FIG. 2) could as well completely have the cross section according to FIG. 6 or completely have the cross section according to FIG. 7.

FIG. 8 shows a fourth cross section of the gasket 38 at the position D-D (see FIG. 4), i.e. FIG. 8 shows a cross section of the bridge 48 (see FIG. 2). The bridge 48—as well as the other bridges 46 and 50 (see FIG. 2)—has a substantially rectangular cross section. The bridges 46, 48 and 50 are thus easily removable from the mold.

In conclusion, the invention relates to a filter element unit. The filter element unit can be used in an air filter of a vehicle with an internal combustion engine. The air filter has a filter housing with a lower part and an upper part. The filter element unit can be inserted between the lower part and the upper part. The filter element unit separates a dirty air side from a clean air side of the air filter. The filter element unit has a filter element and a gasket. A first part of the gasket surrounds the filter element. The first part has preferably a substantially rectangular shape. A second part of the gasket is connected with the first part via at least two, preferably three, bridges. First part and second part can thus be formed completely different from each other to satisfy different sealing requirements. However, even though the first part and the second part can be designed independently from each other, the gasket can still be installed at once into the filter housing, since the gasket consists of a single piece only.

What is claimed is:

1. A filter element unit for an air filter of a vehicle with an internal combustion engine, comprising:
    a filter element, including
        a filter medium;
        and a one-piece gasket, including:
            a first circumferentially closed gasket part of the one-piece gasket, the first circumferentially closed gasket part circumferentially surrounding the filter element and adapted to seal the filter element against a first channel of a filter housing of the air filter;
            a second circumferentially closed gasket part of the one-piece gasket formed unitary with the first circumferentially closed gasket part and spaced apart from the first circumferentially closed gasket part and spaced apart from the filter medium, the second circumferentially closed gasket part adapted to seal a second channel of the filter housing;
            at least two bridges arranged between and spacing apart the first circumferentially closed gasket part and the second circumferentially closed gasket part, the at least two bridges connected at a first end to the first circumferentially closed gasket part, the at least two bridges connected at an opposite end to the second circumferentially closed gasket part;
            wherein the at least two bridges are spaced apart from each other.

2. The filter element unit according to claim 1, wherein the at least two bridges is three bridges.

3. The filter element unit according to claim 1, wherein the first circumferentially closed gasket part of the one-piece gasket has a substantially rectangular form.

4. The filter element unit according to claim 1, wherein the second circumferentially closed gasket part of the one-piece gasket has a substantially rectangular form.

5. The filter element unit according to claim 1, wherein the first circumferentially closed gasket part has a cavity formed therein;
    wherein a protrusion of the filter element is at least partially received into the cavity.

6. The filter element unit according to claim 1, wherein the first circumferentially closed gasket part and the second circumferentially closed gasket part of the one-piece gasket have different cross sections.

7. The filter element unit according to claim 1, wherein at least two bridges have a substantially rectangular cross section.

8. The filter element unit according to claim 1, wherein the first circumferentially closed gasket part and/or the second circumferentially closed gasket part of the one-piece gasket have a least one rib adapted for assembly of the one-piece gasket into the filter housing.

9. The filter element unit according to claim 1, wherein the first circumferentially closed gasket part and/or the second circumferentially closed gasket part of the one-piece gasket have at least two sealing protrusions adapted to seal with a channel of the filter housing in an axial direction.

10. The filter element unit according to claim 9, wherein the at least two sealing protrusions are spaced apart and project outwardly from a first side of the first circumferentially closed gasket part and/or the second circumferentially closed gasket part;
    wherein the first circumferentially closed gasket part and/or the second circumferentially closed gasket part further comprises a second set of at least two sealing protrusions, the second set of at least two sealing protrusions are spaced apart and project outwardly from a opposite side of the first circumferentially closed gasket part and/or the second circumferentially closed gasket part.

11. An air filter, comprising:
    a filter housing;
    a filter element received into an interior chamber of the filter housing, the filter element including:
        a filter medium;
        and a one-piece gasket, including:
            a first circumferentially closed gasket part of the one-piece gasket, the first circumferentially closed gasket part circumferentially surrounding the filter element and adapted to seal the filter element against a first channel of a filter housing of the air filter;
            a second circumferentially closed gasket part of the one-piece gasket formed unitary with the first circumferentially closed gasket part and spaced apart from the first circumferentially closed gasket part and spaced apart from the filter medium, the second circumferentially closed gasket part adapted to seal a second channel of the filter housing;
            at least two bridges arranged between and spacing apart the first circumferentially closed gasket part and the second circumferentially closed gasket part, the at least two bridges connected at a first end to the first circumferentially closed gasket part, the at least two bridges connected at an opposite end to the second circumferentially closed gasket part;
            wherein the at least two bridges are spaced apart from each other;
    wherein the filter element separates a dirty air side from a clean air side of the filter housing chamber in the first channel of the filter housing;
    wherein the second circumferentially closed gasket part of the one-piece gasket seals a second channel in the filter housing;
    wherein the second channel is in flow communication with an inlet or an outlet of the air filter.

* * * * *